(12) United States Patent
Jing et al.

(10) Patent No.: US 12,325,320 B2
(45) Date of Patent: Jun. 10, 2025

(54) VEHICLE FEATURE CONTROL AND BATTERY CHARGE MANAGEMENT DURING PARKED VEHICLE TIME PERIODS

(71) Applicant: GM GLOBAL TECHNOLOGY OPERATIONS LLC, Detroit, MI (US)

(72) Inventors: Xin Jing, Rochester, MI (US); Kiana D. Bassey, Pflugerville, TX (US); Danny Y. Mui, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 313 days.

(21) Appl. No.: 18/070,020

(22) Filed: Nov. 28, 2022

(65) Prior Publication Data

US 2024/0174108 A1 May 30, 2024

(51) Int. Cl.
*B60L 53/60* (2019.01)
*B60L 53/16* (2019.01)
*B60L 58/12* (2019.01)
*H01M 10/42* (2006.01)

(52) U.S. Cl.
CPC ............... *B60L 53/60* (2019.02); *B60L 53/16* (2019.02); *B60L 58/12* (2019.02); *H01M 10/425* (2013.01); *B60L 2250/16* (2013.01); *B60L 2260/52* (2013.01); *H01M 2010/4271* (2013.01); *H01M 2220/20* (2013.01)

(58) Field of Classification Search
CPC .......... B60L 53/60; B60L 53/16; B60L 58/12; B60L 2250/16; B60L 2260/52; H01M 10/425; H01M 2010/4271; H01M 2220/20

USPC ........................................................... 701/22
See application file for complete search history.

(56) References Cited

U.S. PATENT DOCUMENTS

| | | | |
|---|---|---|---|
| 11,300,619 B2 * | 4/2022 | Brown | B60W 50/0097 |
| 11,394,061 B1 * | 7/2022 | Mallia | H02J 7/0013 |
| 11,489,208 B2 * | 11/2022 | Austin | B60L 53/14 |
| 2011/0047102 A1 * | 2/2011 | Grider | H02J 7/007 320/109 |
| 2011/0298417 A1 * | 12/2011 | Stewart | H02J 7/0029 320/132 |
| 2012/0119575 A1 * | 5/2012 | Kurs | H02J 50/12 307/9.1 |

(Continued)

FOREIGN PATENT DOCUMENTS

JP        2012205470 A  * 10/2012
WO    WO-2019030985 A1 *  2/2019 ............. B60L 53/11

*Primary Examiner* — Andrew R Dyer (57) ABSTRACT

A vehicle battery charge management system includes multiple vehicle components each configured to implement a different operational feature of a vehicle, a battery system, and a vehicle control module. The vehicle control module is configured to obtain a state of charge of the battery system, receive a time period specified by user input, the time period indicative of a window of time where the vehicle will be in a parked state, disable at least one of the multiple vehicle components during the time period, and determine an estimated remaining mileage value according to the state of charge of the battery system, a remaining time in the time period, and a predicted energy consumption of each of the multiple vehicle components that are not disabled during the time period, the estimated remaining mileage value indicative of a driving mileage capacity of the vehicle at an expiration of the time period.

17 Claims, 7 Drawing Sheets

(56) References Cited

U.S. PATENT DOCUMENTS

| | | | |
|---|---|---|---|
| 2013/0173807 A1* | 7/2013 | De Groot | G06Q 50/06 709/226 |
| 2013/0249234 A1* | 9/2013 | Higgins | B60K 15/05 220/378 |
| 2014/0266063 A1* | 9/2014 | Loftus | B60L 58/22 320/136 |
| 2021/0061119 A1* | 3/2021 | Akaishi | H02J 1/10 |

* cited by examiner

VEHICLE FEATURE CONTROL AND BATTERY CHARGE MANAGEMENT DURING PARKED VEHICLE TIME PERIODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for disabling vehicle features, managing battery charge and/or estimating remaining mileage during parked vehicle time periods.

Some vehicle features use energy when the vehicle is off (e.g., when the vehicle is parked for an extended period of time), which may cause the battery to remain on full time or substantially full time to support the energy needs of the vehicle features. If the vehicle is off for a sufficient period of time (e.g., a long-term vacation), the battery may be fully drained by the energy needs of the vehicle features that remain at least partially or periodically active during the parked vehicle time period.

SUMMARY

A vehicle battery charge management system includes multiple vehicle components each configured to implement a different operational feature of a vehicle, a battery system configured to provide power to a drive unit of the vehicle and the multiple vehicle components, and a vehicle control module. The vehicle control module is configured to obtain a state of charge of the battery system, receive a time period specified by user input, the time period indicative of a window of time where the vehicle will be in a parked state, disable at least one of the multiple vehicle components during the time period, and determine an estimated remaining mileage value according to the state of charge of the battery system, a remaining time in the time period, and a predicted energy consumption of each of the multiple vehicle components that are not disabled during the time period, the estimated remaining mileage value indicative of a driving mileage capacity of the vehicle at an expiration of the time period.

In other features, the multiple vehicle components include at least one of a telematics unit, a wireless communication interface, a battery management unit, a cabin comfort system, a remote video viewing device, a surround video recording device, and an audio recording device.

In other features, the vehicle control module is configured to receive a disable time window from user input, and the disabling includes disabling the at least one of the multiple vehicle components during the disable time window for each day of the time period.

In other features, the vehicle control module is configured to reenable the disabled at least one of the multiple vehicle components at the expiration of the time period.

In other features, the vehicle control module is configured to receive a disabled feature list from user input, and disabling includes disabling vehicle components that are included in the disabled feature list received from the user input.

In other features, the vehicle control module is configured to determine at least one environmental condition at a location of the vehicle during the parked state, and maintain at least one of the multiple vehicle components in an enabled state according to the at least one environmental condition.

In other features, the system includes a vehicle wireless communication interface configured to communicate with a mobile device, wherein the mobile device is configured to display the estimated remaining mileage value on a user interface of the mobile device.

In other features, the mobile device is configured to, in response to determining that a vehicle mileage reminder preference has been selected via user input, obtain a previously displayed estimated remaining mileage value, receive a current remaining mileage estimate according to at least a current state of charge of the battery system, and in response to determining that a difference between the current remaining mileage estimate and the previously displayed estimated remaining mileage value is greater than a specified threshold, display the current remaining mileage estimate on the user interface as a vehicle mileage reminder.

In other features, the mobile device is configured to display an indicator to allow user input to selectively activate and deactivate a vacation mode operation, the vehicle control module is configured to disable the at least one of the multiple vehicle components during the time period in response to the vacation mode operation being activated, and the vehicle control module is configured to enable each of the multiple vehicle components in response to the vacation mode operation being deactivated.

In other features, the system includes a charging port on an exterior of the vehicle, the charging port configured to supply power to the battery system, and a charging port door configured to selectively lock and unlock to inhibit and allow access to the charging port, wherein the mobile device is configured to send an unlock command to the vehicle control module to remotely unlock the charging port door to allow charging of the battery system, in response to an unlock charging port door input received at the user interface of the mobile device.

In other features, the vehicle control module is configured to receive a periodic time period specified by user input, the periodic time period indicative of a window of time where the vehicle will be in a parked state at periodic time intervals, and disable at least one of the multiple vehicle components during the periodic time period, for each of multiple periodic time intervals.

In other features, the vehicle control module is configured to determine an estimated energy savings value according to an amount of time in each periodic time period, and a predicted energy consumption of each of the at least one of the multiple vehicle components that are disabled in an amount of time equal to the periodic time period.

In other features, the vehicle control module is configured to receive a mileage reservation value specified by user input, the mileage reservation value indicative of a desired minimum amount of driving mileage capacity of the vehicle at an expiration of the time period, determine whether the estimated remaining mileage value is greater than or equal to the received mileage reservation value, and transmit a result of the determination to a mobile device for display on a user interface of the mobile device.

In other features, the vehicle control module is configured to, in response to a determination that the estimated remaining mileage value is less than the received mileage reservation value, automatically disable at least one more of the multiple vehicle components during the time period to increase energy consumption savings during the time period.

In other features, the vehicle control module is configured to, in response to determining that the vehicle is in a plugged in state during the time period, periodically inhibit charging of the battery system to avoid maintaining the battery system at a 100% state of charge for a duration of the time period.

A method of managing a charge level of a battery system of a vehicle includes obtaining a state of charge of the battery system, the battery system configured to provide power to a drive unit of the vehicle and multiple vehicle components each configured to implement a different operational feature of a vehicle, receiving a time period specified by user input, the time period indicative of a window of time where the vehicle will be in a parked state, disabling at least one of multiple vehicle components during the time period, determining an estimated remaining mileage value according to the state of charge of the battery system, a remaining time in the time period, and a predicted energy consumption of each of the multiple vehicle components that are not disabled during the time period, the estimated remaining mileage value indicative of a driving mileage capacity of the vehicle at an expiration of the time period, and transmitting the estimated remaining mileage value to a mobile device for display on a user interface of the mobile device.

In other features, the multiple vehicle components include at least one of a telematics unit, a wireless communication interface, a battery management unit, a cabin comfort system, a remote video viewing device, a surround video recording device, and an audio recording device.

In other features, the method includes receiving a disabled feature list from user input, wherein disabling includes disabling vehicle components that are included in the disabled feature list received from the user input.

In other features, the method includes receiving a periodic time period specified by user input, the periodic time period indicative of a window of time where the vehicle will be in a parked state at periodic time intervals, and disabling at least one of the multiple vehicle components during the periodic time period, for each of multiple periodic time intervals.

In other features, the method includes receiving a mileage reservation value specified by user input, the mileage reservation value indicative of a desired minimum amount of driving mileage capacity of the vehicle at an expiration of the time period, determining whether the estimated remaining mileage value is greater than or equal to the received mileage reservation value, and transmitting a result of the determination to the mobile device for display on the user interface of the mobile device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In some examples of the present disclosure, a 'vacation mode' feature allows a user to reduce or minimize energy consumption during a parked vehicle event (e.g., a vacation where the user will not be driving the vehicle for an extended period of time). The user may disable selected vehicle features, which may be non-safety related features, to extend the charge of the vehicle battery so there is a greater remaining vehicle driving mileage available when the user returns to drive the vehicle again.

In some examples, the user is able to provide a customized selection of features that they would like to disable to reduce energy consumption. Example features include, but are not limited to, telematics safety services, cabin comfort features, vehicle over the air (OTA) updates, battery cool down and/or heat up controls, vehicle to vehicle (V2V) communication, vehicle to load (V2L) communication, remote video viewing, surround video recording, vehicle health management, cabin monitoring, etc.

Example systems and methods may provide real time or near real time display of remaining mileage based on battery charge level characteristics, estimated vehicle mileage remaining after vacation (e.g., how far the vehicle will be able to drive based on its estimated charge level at the end of a specified vacation time period) according to the selected disabled vehicle features during the vacation parking event, etc.

In some examples, a user selects which vehicles to enable or disable during specified sub-periods of the parked vehicle event. For example, if a parked vehicle event is scheduled to last for one week, a user may disable a security monitoring video camera during daytime hours, and enable the security monitoring video during nighttime hours.

A user may input a desired remaining mileage after vacation to a mobile device application, and the application automatically adjusts which vehicle features to disable to achieve the desired remaining mileage target. For example, if the user wants to have fifty miles of driving distance remaining when they return from a vacation in one week, the system may determine which vehicle features should be disabled during the week to maintain enough vehicle battery charge at the end of the week for fifty miles of driving distance. The vehicle features may be disabled based on a prioritization list (e.g., features that consume the most energy during parked vehicle events, features that are most or least important to the user to keep on during a parked vehicle event, etc.).

In some examples, a user may be able to open a charging door remotely for another person to charge the vehicle. For example, a mobile application may allow a user to unlock or open a charge port door of the vehicle, so that a charging service (or friend or relative) can charge the vehicle when desired. The option to open the charge port door may be provided to the user when the application estimates that there will not be enough battery charge remaining at the end of the specified vacation period to provide the desired driving distance, even if all available optional features are disabled during the vacation time period.

Example systems and methods may allow for periodic disabling of vehicle features, such as daily parking events (or other suitable frequencies of vehicle parking events). For example, a user may specify that the vehicle will be parked at their office every weekday, to selectively disable features between the hours of 9 AM and 5 PM on weekdays, and selectively disable the same or other vehicle features between the hours of 11 PM and 6 AM each night while the vehicle is parked at home.

In some examples, selectively disabling vehicle features may allow an electric vehicle to operate more like a traditional gas engine car that can park for longer periods of time and remain drivable after the vacation time period without requiring a recharge. A user may select which features they would like to keep enabled during the vehicle parking event, such as enabling a recording camera if the vehicle is parked in a public parking lot, while still saving energy by disabling other unused vehicle features.

Vehicle features may be disabled based on specified conditions. For example, if a vehicle is parked in a hot environment, some features may have to be enabled at least periodically, such as cooling features to protect vehicle hardware. A user may be provided with a notification when enabling vacation mode to park the vehicle at a location with an appropriate temperature (e.g., a location that is not too hot or too cold to reduce battery high voltage energy or impact battery life).

A mobile device application may provide a user with various options, such as disabling all features, disabling all non-safety related features, disabling only features that do not have an impact on vehicle life, etc. Based on a scheduled time of ending a parked vehicle event, disabled vehicle features may be re-enabled, and may be maintained at the same or similar setting as they were prior to activating the vacation mode.

A mobile device may be able to remotely monitor an estimated remaining mileage of the vehicle in real time or near real time, and may provide remote control of a charging door of the vehicle. For example, the user may control the charging door to allow a charging service (or friend or relative) to charge the vehicle even while the user is away from the vehicle.

In some examples, if a vehicle is left plugged in during the vacation time period, the system may determine when to periodically charge the vehicle to avoid maintaining a 100% state of charge (SOC) of the battery during the entire vacation time period. For example, the system may let the battery charge reduce to 50% before charging it up to 80% (or other suitable values), to protect the battery life.

Figure 1:
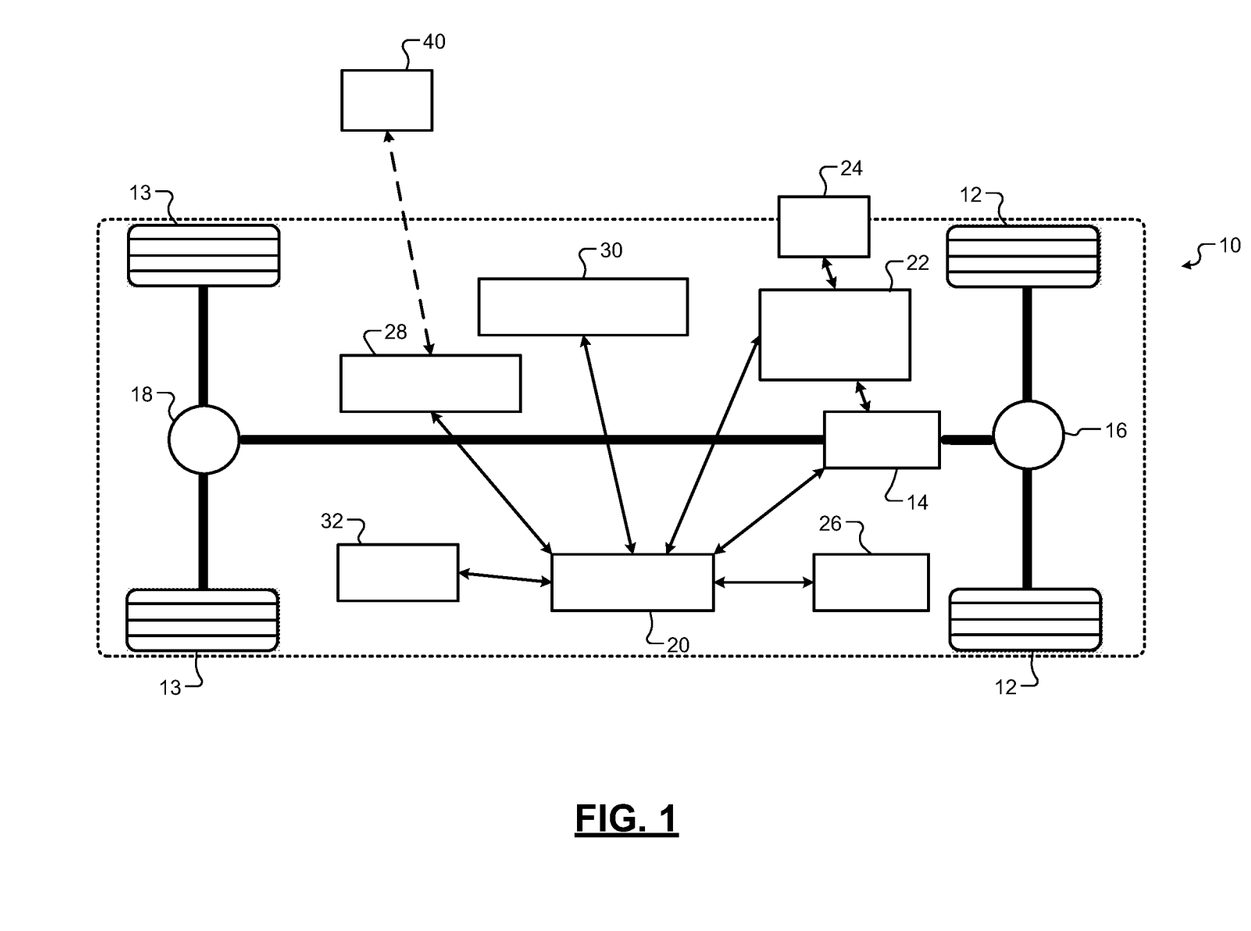
FIG. 1 is a functional block diagram of an example of a vehicle including a vehicle control module for implementing battery charge management during a parked vehicle time period, according to the present disclosure.

Referring now to FIG. 1, a vehicle 10 includes front wheels 12 and rear wheels 13. In FIG. 1, a drive unit 14 selectively outputs toque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle. For purposes of illustration, drive units including a battery system 22 and an electric motor will be described below.

Some examples of the drive unit 14 may include any suitable electric motor, a power inverter, and a motor controller configured to control power switches within the power inverter to adjust the motor speed and torque during propulsion and/or regeneration. The battery system 22 provides power to or receives power from the electric motor of the drive unit 14 via the power inverter during propulsion or regeneration.

While the vehicle 10 includes a single drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

As shown in FIG. 1, the vehicle includes a charge port 24 for charging the battery system 22. The charge port 24 may be any suitable charging cover, door, etc., which may be opened to allow charging of the battery system 22 and closed to inhibit or prevent charging of the battery system 22. In some examples, a door of the charge port 24 may be opened remotely (e.g., via a command from the mobile device 40), to allow another person to charge the vehicle 10 while a user is away from the vehicle 10.

The battery system 22 may include any suitable arrangement of one or more battery cells, module, etc. for providing power to components of the vehicle 10. For example, the battery system 22 may supply power to drive an electric motor of the drive unit 14, may supply power to operate the vehicle monitoring module 30, the wireless communication interface 28, the telematics unit 32, the cabin comfort system 26, etc. The battery system 22 may output voltages at one or more levels, such as a high voltage level (e.g., 110V, 120V, 200V, 208V, 240V, 400V, 600V, 800V, etc.) to power vehicle components that operate on higher voltages, and a low voltage level (e.g., 3.3V, 5V, 12V, 24V, 48V, etc.) to power vehicle components that operate on lower voltages.

The vehicle control module 20 may be configured to control operation of one or more vehicle components, such as the battery system 22, the charge port 24, the drive unit 14, the cabin comfort system 26, the vehicle monitoring module 30, the wireless communication interface 28, the telematics unit 32, etc. The vehicle control module may include any suitable processing circuitry and memory to implement control functions, including examples of processes for controlling battery charge management during a parked vehicle time period, as described herein. In some examples, the vehicle control module 20 may be considered as a system controller.

The vehicle monitoring module 30 may include any suitable components for monitoring one or more aspects of the vehicle. For example, the vehicle monitoring module 30 may include one or more sensors, one or more cameras, one or more microphones, etc. The vehicle monitoring module 30 may provide remote video viewing, video recording of the exterior and/or interior of the vehicle, audio recording, etc.

The wireless communication interface 28 may include one or more wireless antennas for transmitting and/or receiving wireless communication signals. The wireless communication interface 28 may communicate via any suitable wireless communication protocols, including but not limited to vehicle to vehicle (V2V) communication, vehicle to load (V2L) communication, Wi-Fi communication, wireless area network (WAN) communication, cellular communication, personal area network (PAN) communication, short-range wireless communication (e.g., Bluetooth), etc. For example, the wireless communication interface 28 may communicate with a mobile device 40 over one or more wireless and/or wired networks, to allow a user to selectively enable and disable vehicle features during a vacation mode parked vehicle event.

The telematics unit 32 may monitor telematics of the vehicle 10 for safety purposes, such as vehicle speed, vehicle location, vehicle braking and acceleration, etc. The cabin comfort system 26 may provide control of properties of an interior environment of the vehicle 10, such as air conditioning, heating, etc.

Figure 2A:
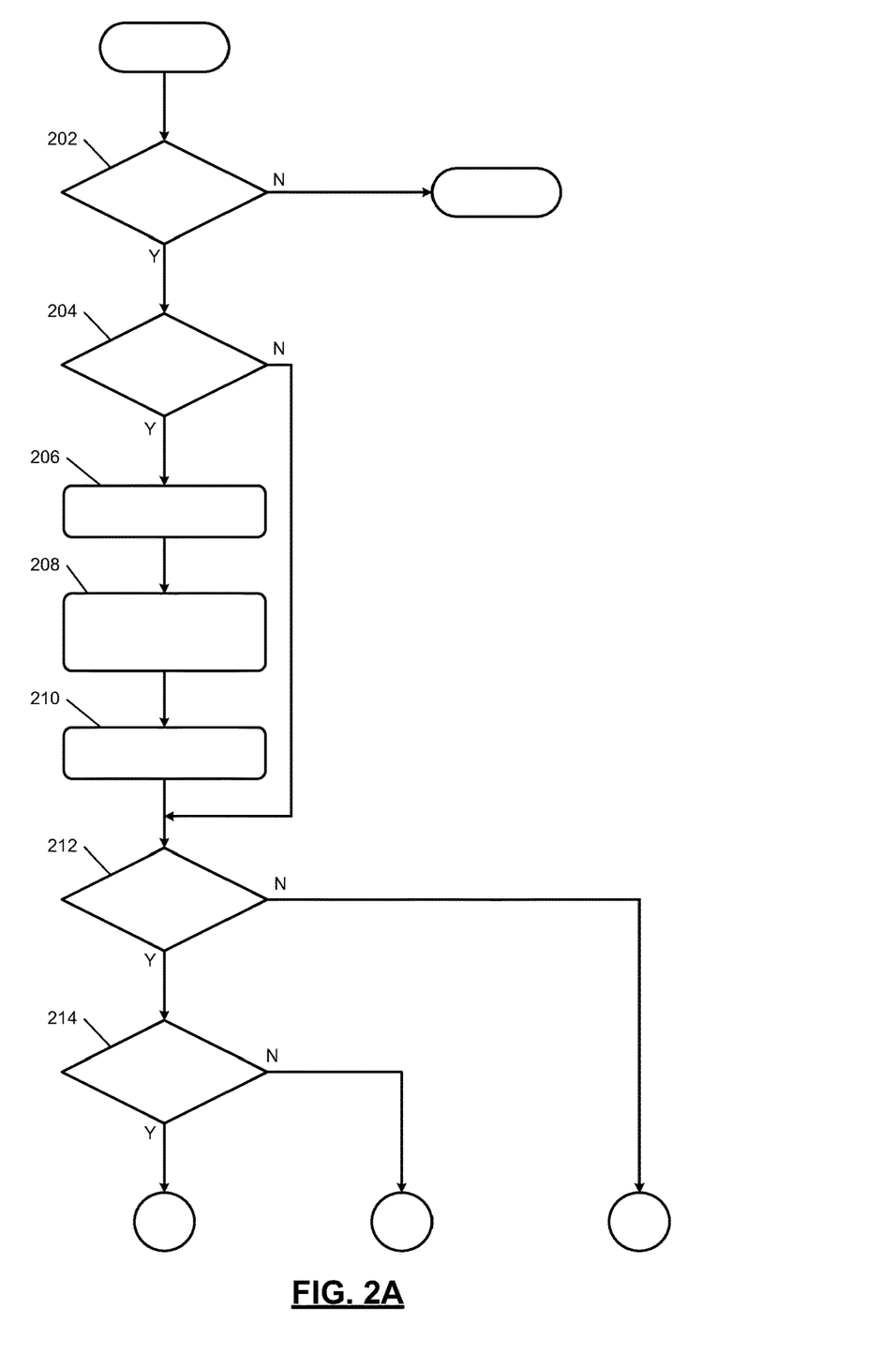
FIGS. 2A-2B are a flowchart illustrating an example process for controlling battery charge management during a parked vehicle time period using a mobile device, according to the present disclosure.
Figure 2B:
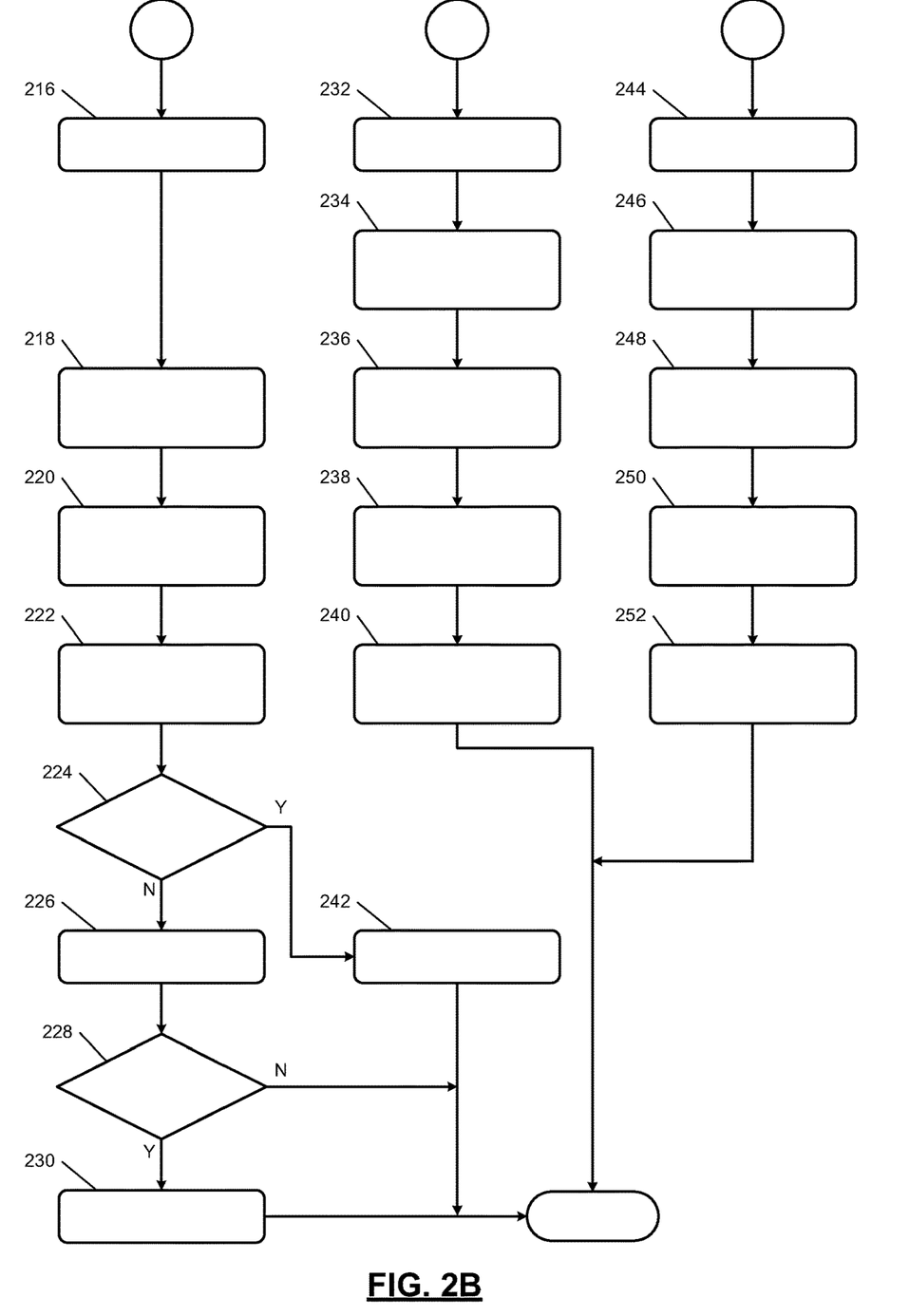

FIGS. 2A-2B illustrate an example process for controlling battery charge management during a parked vehicle time period using a mobile device. The process may be performed by, for example, the mobile device 40 of FIG. 1. The mobile device 40 may be a cell phone, a computer, etc., which includes a controller configured to determine whether a vacation mode has been enabled at 202 of FIG. 2A. If a user has not enabled vacation mode at 202, the process ends.

If the controller determines that the vacation mode has been enabled at 202, control proceeds to 204 to determine whether a remaining mileage reminder has been set. For example, the user may specify that they would like to receive periodic updates of the remaining mileage capacity of the vehicle based on the current charge level at different time intervals. If the controller determines at 204 that a remaining mileage reminder preference has been set, control obtains a last displayed mileage at 206 (e.g., the last mileage value that was presented to the user). Control then obtains a current mileage from a high voltage energy management module (e.g., a module of the vehicle control module 20 of FIG. 1), at 208. The high voltage energy management (HVEM) module may be considered as including functions that reside in the vehicle control module 20 or another suitable module. An example process for determining current mileage capacity based on the current charge of the vehicle battery system 22 is described further below with reference to FIG. 3.

At 210, the controller is configured to determine whether a difference between the current estimated mileage remaining, and the last mileage presented to the user, is greater than a specified threshold (such as 5 miles, 10 miles, 20 miles, 100 miles, etc.). The controller is configured to display a notice to the user if the difference is greater than the threshold. In this example, the user may be updated periodically as the remaining capacity of the battery, and the corresponding mileage the capacity can provide, reduces over time. Although FIG. 2A illustrates providing notifications based on thresholds of decreasing mileage, in other example embodiments the remaining mileage indications may be sent based on periodic time intervals or other suitable criteria.

After displaying the notice at 210, or determining that the remaining mileage reminder is not set at 204, the controller is configured to determine at 212 whether a vacation time window has been specified by the user. For example, the user may indicate that the vehicle is expected to stay in an unused park status for a specified period of time, such as a week, a month, etc.

If the controller determines at 212 that the user has specified a vacation time window, control proceeds to 214 to determine whether a mileage reservation value has been specified by the user. A user may indicate that they would like at least a threshold amount of mileage capacity to be remaining in the battery system 22 at the end of the specified vacation time window. For example, the user may input that they would like at least 50 miles of driving to be remaining in the battery charge at the end of their week vacation.

If the controller determines that 214 that the user has specified a mileage reservation value, control proceeds to 216 to obtain the user reservation mileage value, as shown in FIG. 2B. Control then transmits the mileage reservation value to a low voltage energy management module (e.g., a module of the vehicle control module 20 of FIG. 1), at 218. The low voltage energy management (LVEM) module may be considered as including functions that reside in the vehicle control module 20 or another suitable module. An example of processing performed by a low voltage energy management module is described further below, with reference to FIG. 4.

At 220, the controller is configured to obtain an estimated remaining mileage value from the high voltage energy management module. An example of estimating a remaining mileage value is described further below with reference to FIG. 3. In some examples, the low energy management module and the high voltage energy management module may be part of the vehicle control module 20. Although FIGS. 2A and 2B refer to the voltage energy management modules and high voltage energy management module separately, in other examples various calculations described herein may be performed by a single processing circuitry, etc.

At 222, the controller is configured to display a current mileage value and an estimated remaining mileage value at the end of the specified vacation mode time period. For example, the controller may display on the screen of the mobile device 40 that the battery charge currently supports a driving mileage estimate of 100 miles, and the estimated driving mileage available after the end of the current vacation mode time period will be fifty miles (e.g., due to energy consumed by enabled features of the vehicle 10 while the vehicle is parked).

The controller is configured to determine whether a mileage target is met at 224. For example, the controller may determine whether an estimated remaining mileage at the end of the vacation time period is greater than or equal to a mileage reservation value provided by the user. If the user has specified a mileage reservation value of thirty miles, and the estimated mileage remaining at the end of the vacation time period is sixty miles, the controller would determine that the mileage reservation value is met.

If the controller determines the 224 that the mileage reservation target is met, the controller displays the remaining mileage estimate for after the specified vacation time period ends, at 242. If control determines at 224 that the mileage reservation value will not be met at the end of the vacation time window, the controller notifies the user that the desired mileage reservation value will not be met at 226.

The controller may be configured to optionally allow the user to select whether or not to remotely open a charging door of the vehicle, such as a cover of the charge port 24, to allow another person to charge the vehicle 10. For example, if the controller determines that the mileage reservation value will not be met based on the estimated remaining mileage at the end of the vacation time period, control may allow a user to remotely unlock or open the charging door so that a charging service, friend, or relative can charge the vehicle at least partially while the user is away from the vehicle.

If the mobile device 40 receives an open charge door command from the user at 228, the charging port door is opened at 230. For example, the charging port door may be unlocked, may be opened at a specified time when another person will be available to charge the vehicle 10, etc. If the controller does not receive an open charge door command at 228, or after the controller displays the remaining mileage estimate for after the vacation time period has ended at 242, the process ends.

If the controller determines at 214 (of FIG. 2A) that the user has not specified a desired mileage reservation at the end of the vacation time period, control is configured to obtain a user vacation time period setting at 232. For example, the user may input that the vehicle parking event will last for one week, or may specify an end date and/or time for the parking event, etc.

At 234, controller is configured to obtain a user disabled feature list, and is optionally configured to obtain time windows for disabling the features. For example, a user may indicate that they would like to disable remote monitoring services in order to conserve energy, a user may indicate that they would like to disable cabin comfort system features to conserve energy, etc. In some examples, the user may specify a time period for disabling features, such as disabling remote monitoring video surveillance only during daytime hours for each day of the vacation time period.

At 236, the controller is configured to transmit the disabled feature list received by the user to a low voltage energy management module. The controller is configured to obtain an estimated mileage from the high voltage energy module at 238, which may be based on the vehicle features that the user indicated could be disabled during the vacation time period. The controller is configured to display the current mileage remaining, and the estimated mileage remaining at the end of the vacation time period, at 240.

If the controller determines that the user has not specified a vacation time window at 212 (as shown in FIG. 2A), the controller obtains a user daily parking time window at 244. For example, a user may indicate a specified time period each day, each week, etc., where the user expects the vehicle to normally be in a parked state.

The controller is configured to obtain a user disabled feature list, and optionally time windows for the disabled features, at 246. The controller transmits the disabled feature list to a low voltage energy management module at 248, and obtains daily mileage savings from a high voltage energy management module at 250. For example, the controller may receive a value indicating how much energy will be saved each day (or other specified time period), if the vehicle disables the selected features during the vehicle parking event for each period (e.g., each day). The controller is configured to display the energy savings via the phone application at 252, such as on the screen of the mobile device 40.

Figure 3:
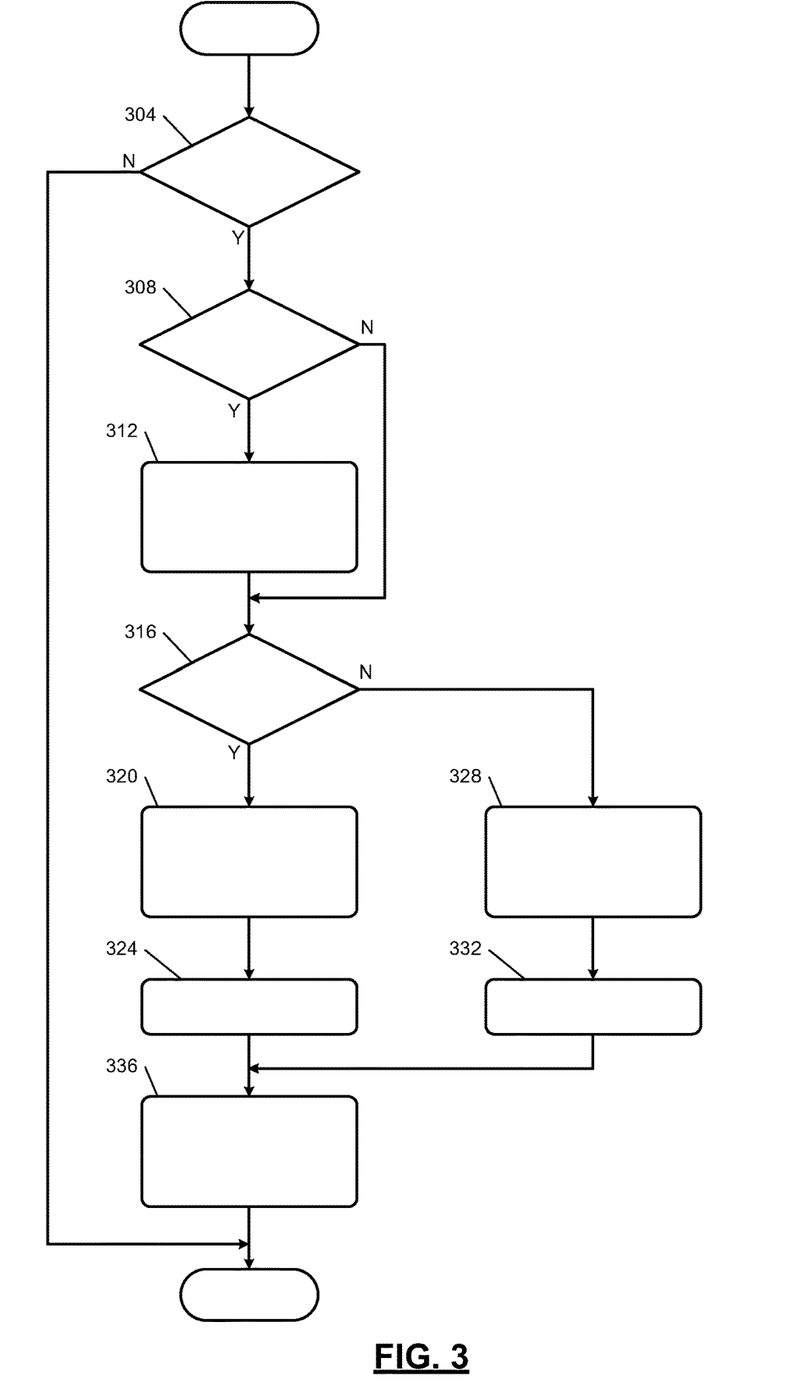
FIG. 3 is a flowchart illustrating an example process for determining energy consumption by a high voltage energy management module, according to the present disclosure.

FIG. 3 is a flowchart illustrating an example process for determining energy consumption by a high voltage energy management module. The process of FIG. 3 may be performed by, for example a system controller of the vehicle control system 30 of FIG. 1.

As shown in FIG. 3, the controller is configured to determine whether a vacation mode has been enabled at 304. If the user has not enabled vacation mode, the process ends. If the user has enabled the vacation mode at 304, control proceeds to 308 to determine whether a remaining mileage reminder preference has been set.

If a user has set a remaining mile reminder preference at 308, the controller is configured to transmit a current mileage remaining estimate to the phone application at 312. For example, the controller may periodically calculate an estimated current driving mileage available based on a current charge status of the battery system 22, and then send that estimated current driving mileage periodically to the mobile device 40 when the user has set a preference for a remaining mileage reminder.

After transmitting the current mileage remaining to the mobile device 40 at 312, or after determining that the remaining mileage reminder has not been set at 308, the controller is configured to determine whether a vacation time window has been specified by the user at 316. If the controller determines that the vacation time window has been specified by the user at 316, control proceeds to 320 to calculate low voltage and high voltage energy consumption based on the remaining time of the vacation time period, and the features that are selected for enablement or disablement by the user during the vacation time period window.

The energy consumption for selected feature vehicle features that are enabled based on the user specification, may be calculated using any suitable algorithms. For example, the controller may use preset hourly energy consumption values that have been determined for each vehicle feature during manufacturing or previous testing, and multiply those values for each enabled feature by a remaining number of hours in the vacation time window. It should be apparent that time period values other than hourly may be used in determining energy consumption of enabled features (such as by the day, every six hours, etc.).

In some examples, the energy consumption of features within the specific vehicle 10 may be monitored over a history of operation of the vehicle 10, to provide increased accuracy of estimation based on amounts of energy actually consumed historically for each enabled feature. The energy consumption may be weighted to provide greater weight to more recent energy consumption measurements for the features, or may be limited to energy consumption of the enabled vehicle features during the current vacation time period window, in order to provide a more accurate prediction of remaining energy consumption. For example, if the vehicle is parked in a hot location that is requiring each enabled feature to consume more energy than normal, the remaining mileage estimate and energy consumption calculations may be more accurate if they take into account the fact that the enabled features have been consuming above average energy during the current vacation time period window.

At 324, the controller is configured to calculate the remaining mileage available for the vehicle 10 after the vacation time period has ended. For example, the controller may use the energy consumption that was calculated based on the remaining vacation time period and the enabled features at 320, to predict the level of charge of the battery at the end of the vacation time period, by subtracting the calculated energy consumption from the current level of charge of the battery system 22. The estimated level of charge of the battery at the end of the vacation time period may be used to estimate a driving mileage that will be available at the end of the vacation time period.

If the controller determines at 316 that user has not specified a vacation time window, control proceeds to 328 to calculate voltage energy savings based on a daily or other time period, and selected enabled and disable features. For example, control may determine the amount of energy savings that will be obtained by disabling the specified features for the daily or other periodic interval indicated by the user. If the user turns off the cabin comfort feature while they are at work from 9:00 AM to 5:00 PM, the controller may determine how much energy will be saved from 9:00 AM to 5:00 PM with the cabin comfort system turned off.

The controller is configured to calculate a mileage savings per day at 332 (or other specified time period interval). For example, control may determine an amount of energy saved based on all features that are disabled during a time period of 9:00 AM to 5:00 PM, and calculate an estimated mileage savings based on the reduced energy consumption during that time period. After calculating the estimated remaining mileage for after the vacation time period ends at 324, or calculating the mileage savings per day at 332, control is configured to transmit the remaining mileage estimate, or the saved mileage per day, to the mobile device 40, at 336.

Figure 4:
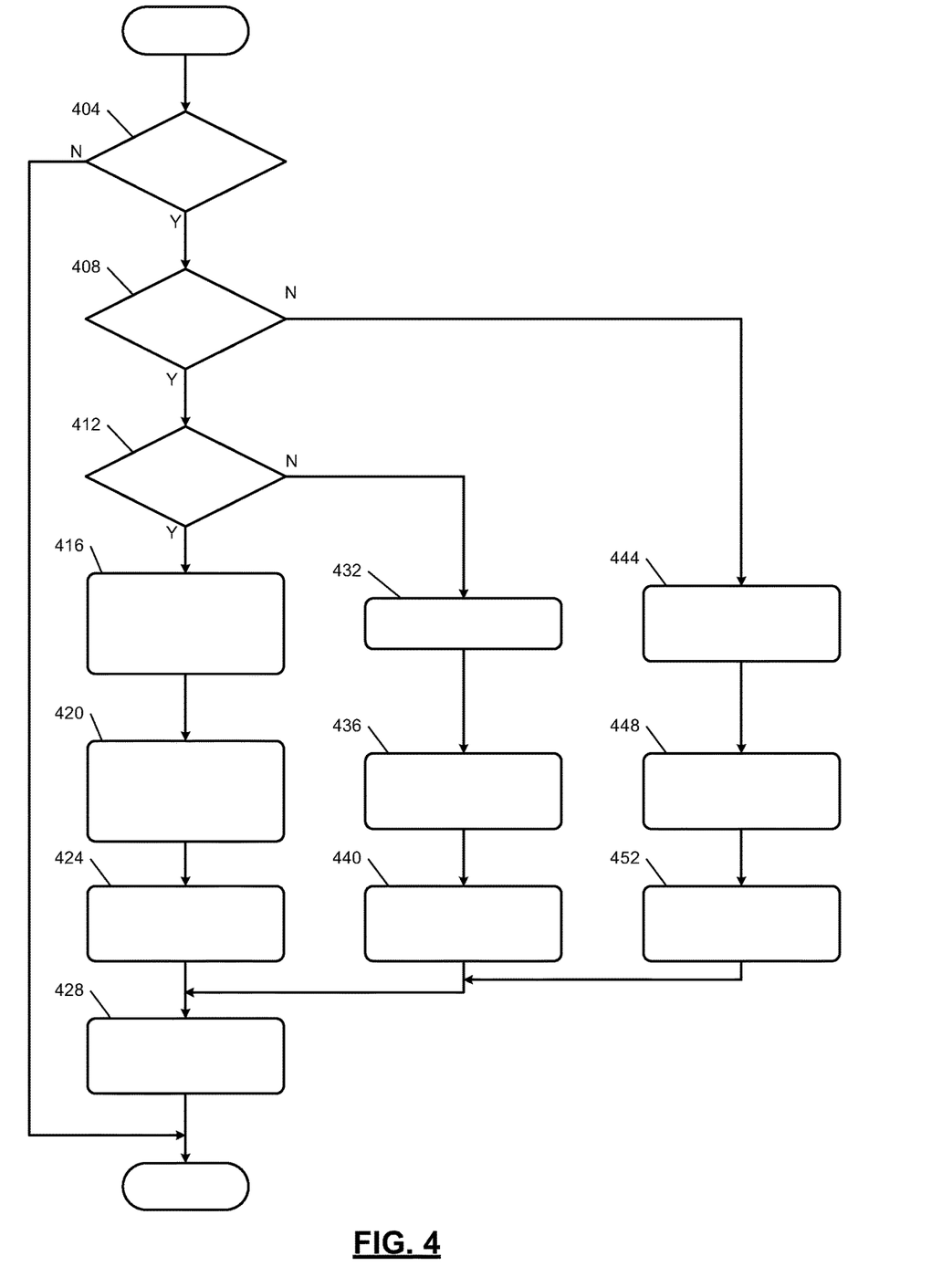
FIG. 4 is a flowchart illustrating an example process for determining energy consumption based on low voltage vehicle features, according to the present disclosure.

FIG. 4 is a flowchart illustrating an example process for determining energy consumption based on low voltage vehicle features. The process of FIG. 4 may be performed by, for example, a controller of the vehicle control module 20. At 404, the controller is configured to determine whether a vacation mode has been enabled by the user. If the vacation mode is not enabled, the process ends.

It's the controller determines at 404 that the user has enabled the vacation mode, the controller is configured to determine whether the user specified a vacation time period window at 408. If so, the controller is configured to determine whether the user specified a mileage reservation value at 412.

If the user specified a mileage reservation preference at 412, control proceeds to 416 to obtain the user's desired mileage reservation value, such as from an application on the mobile device 40. At 420, the controller is configured to disable features of the vehicle 10 based on, for example, a remaining time of the vacation mode time period, an energy consumption of each feature, a specified priority of each feature, the desired mileage reservation value specified by the user, etc. For example, control may automatically determine which features should be disabled in order to meet the target mileage reservation value specified by the user. An example of determining features to disable in order to meet a target mileage reservation value is described further below with reference to FIG. 5.

At 420 of FIG. 4, the controller may be configured to disable features that the user specified as desiring to disable. The controller may determine which vehicle features consume the most energy and disable the greatest energy consuming features. The controller may determine which features should be disabled based on a priority (e.g., a priority list that prioritizes vehicle features based on most or least energy consumption, vehicle features that are needed for vehicle safety, vehicle features have been prioritized in a list from the user, etc.).

After disabling one or more vehicle features, the controller is configured to calculate the remaining energy consumption during the vacation time period window at 424. For example, the controller may be configured to identify which vehicle features have not been disabled, and multiply an energy consumption for each of those enabled features with a remaining time of the vacation time period. The controller then then transmits the remaining energy consumption value to the high voltage energy module at 428.

If control determines at 412 that a user has not specified a desired mileage reservation value, control proceeds to 432 to obtain a vacation time period from the user. For example, a user may specify that they plan to leave the vehicle in a parked state for the next ten days, without identifying any desired remaining mileage at the end of the ten days.

The controller is configured to obtain a user disable feature list at 436. For example, the controller may receive a list of features the user would like to disable during the vacation time period in order to save energy, which may be received via a user interface of the mobile device 40. While the system controller may determine at 420 which features should be disabled in order to meet a target remaining mileage value if a target reservation mileage value has been specified by the user, at 436 where the user has not specified a remaining mileage value, the controller may only disable each feature specified by the user in a list (e.g., because there is no need to meet any identified remaining mileage value). At 440, the controller is configured to calculate the energy consumption during the specified vacation time period based on the disabled and enabled vehicle features.

If the controller determines at 408 that a vacation time window has not been specified by the user, the controller is configured to obtain a daily parking time window from the user at 444. Although FIG. 4 refers to a daily parking time window, in other examples other periodic intervals may be specified by the user.

At 448, the controller is configured to obtain a user disabled feature list. The controller then calculates the daily energy consumption based on the features at 452. For example, if the user has indicated that they would like to disable three vehicle features during a working period of 9:00 AM to 5:00 PM where they expect the vehicle to be parked, the controller may be configured to calculate how much energy will be consumed by the remaining features that are enabled during that time period. At 428, the controller is configured to transmit the calculated energy consumption to the high voltage energy module.

Figure 5:
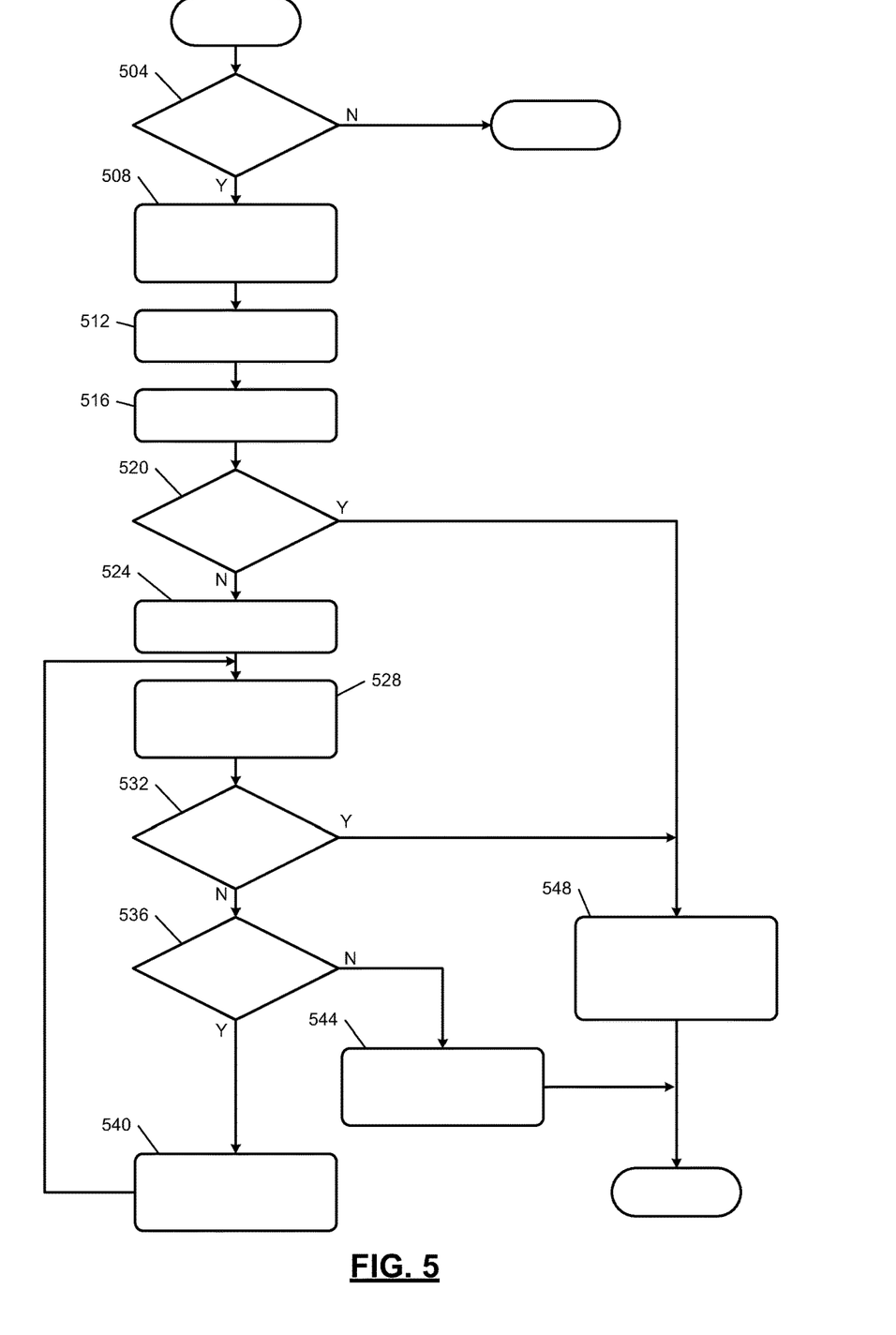
FIG. 5 is a flowchart illustrating an example process for determining whether a reserved mileage target value may be achieved, according to the present disclosure.

FIG. 5 is a flowchart illustrating an example process for determining whether a reserved mileage target value may be achieved. The process of FIG. 5 may be performed by, for example, a system controller of the vehicle control module 20, or the mobile device 40. At 504, the controller is configured to determine whether the user has specified a mileage reservation value. If not, the process ends.

If the use has selected a mileage reservation value at 504, the controller is configured to calculate a mileage consumption per day based on the existing features, at 508 For example, control may determine how much mileage of the battery capacity will be consumed each day (or other specified period) with the vehicle features that are currently enabled.

At 512, the controller is configured to calculate a remaining mileage after the vacation time period has ended. For example, the controller may multiply a mileage consumption per day with a remaining amount of time in the vacation time period. At 516, the controller sets a mileage reservation status as unclear (e.g., sets a variable flag as unknown yet for whether a user's specified mileage reservation value may be met).

The controller is configured to determine whether the calculated remaining mileage value after the vacation time period ends is grater than a user's specified mileage reservation value, at 520. For example, control may determine whether there will be enough battery capacity to provide a user's desired mileage reservation value when the vacation time period ends.

If the calculated remaining mileage is greater then the reserved mileage value at 520, control transmits the remaining mileage after the vacation to a mobile device (such as the mobile device 40), at 548. If the calculated remaining mileage is less than the reserved mileage value, the controller is configured to select a lower priority feature for disabling at 524. For example, various vehicle features may be assigned priority based on any suitable criteria, such as features that consume the most or least energy, features that are more or less important for preserving vehicle safety or vehicle component lifetime, features that have been identified by a user as having a higher or lower priority, etc.

At 528, control updates the remaining mileage value if the selected features are disabled. For example, the first feature in the priority list may have an energy consumption equal to about twenty miles worth of driving distance over the remaining vacation time period. If the feature is disabled for the remainder of the vacation time period, the controller may update the reaming mileage value by adding twenty miles to the estimated mileage available at the end of the vacation time period.

The controller is then configured to determine when the updated remaining mileage is greater than the mileage reservation value at 532. For, example, control may determine whether adding twenty miles based on disabling the lowest (or highest) priority feature increases the estimated remaining mileage above the user's specified mileage reservation target. If so, the controller is configured to transmit the updated estimated remaining mileage value (e.g., including the added twenty miles from the disabled vehicle feature) to a mobile device.

If the controller determines at 532 that the updated remaining mileage estimate is still less than the target reservation mileage value, control proceeds to 536 to determine whether there are any additional features that may be disabled. If so, control selects the next lowest (or highest) priority feature to disable at 540, and returns to 528 to update the remaining mileage if the next priority feature is also disabled (in addition to the first priority feature described above). For example, if the second priority feature would add ten miles to the remaining mileage estimate at the end of the vacation time period, control may determine that a total of thirty miles have been added to the original estimated mileage remaining.

The above process may be repeated until enough features are disabled so that the estimated remaining mileage value eventually exceeds the user's target mileage reservation value at 532, or if the controller determines that even after disabling all eligible vehicle features the remaining mileage is still less that the user's mileage reservation value. In that case, the controller may notify the user that the target reserved mileage reservation cannot be met, at 544. The user may then adjust their target reservation value, unlock the charge port 24 for a charging service or other person to charge the vehicle 10, etc.

In various implementations, the mileage reservation function may be run periodically. For example, the system may check once per day, once every three days, once every twelve hours, etc., whether enough charge is currently stored in the vehicle battery to provide a desired mileage of driving distance at the end of the vacation time period (where the desired mileage of driving distance may be a specified mileage reservation distance of the user, such as fifty miles of battery charge remaining at the end of the vacation time period). In some example embodiments, the vacation time period may generally refer to any period of time for which the vehicle will be parked without driving, as specified by the user.

If needed, during the periodic runs of the mileage reservation function, the system may adjust which features of the vehicle are enabled or disabled, in order to meet the specified mileage reservation distance at the end of the time period. For example, if the battery is draining faster than expected during the time period, during a periodic run of the mileage reservation check function, the system may determine that one or more additional vehicle features need to be disabled in order to meet the mileage reservation distance specified by the user at the end of the time period.

Figure 6:
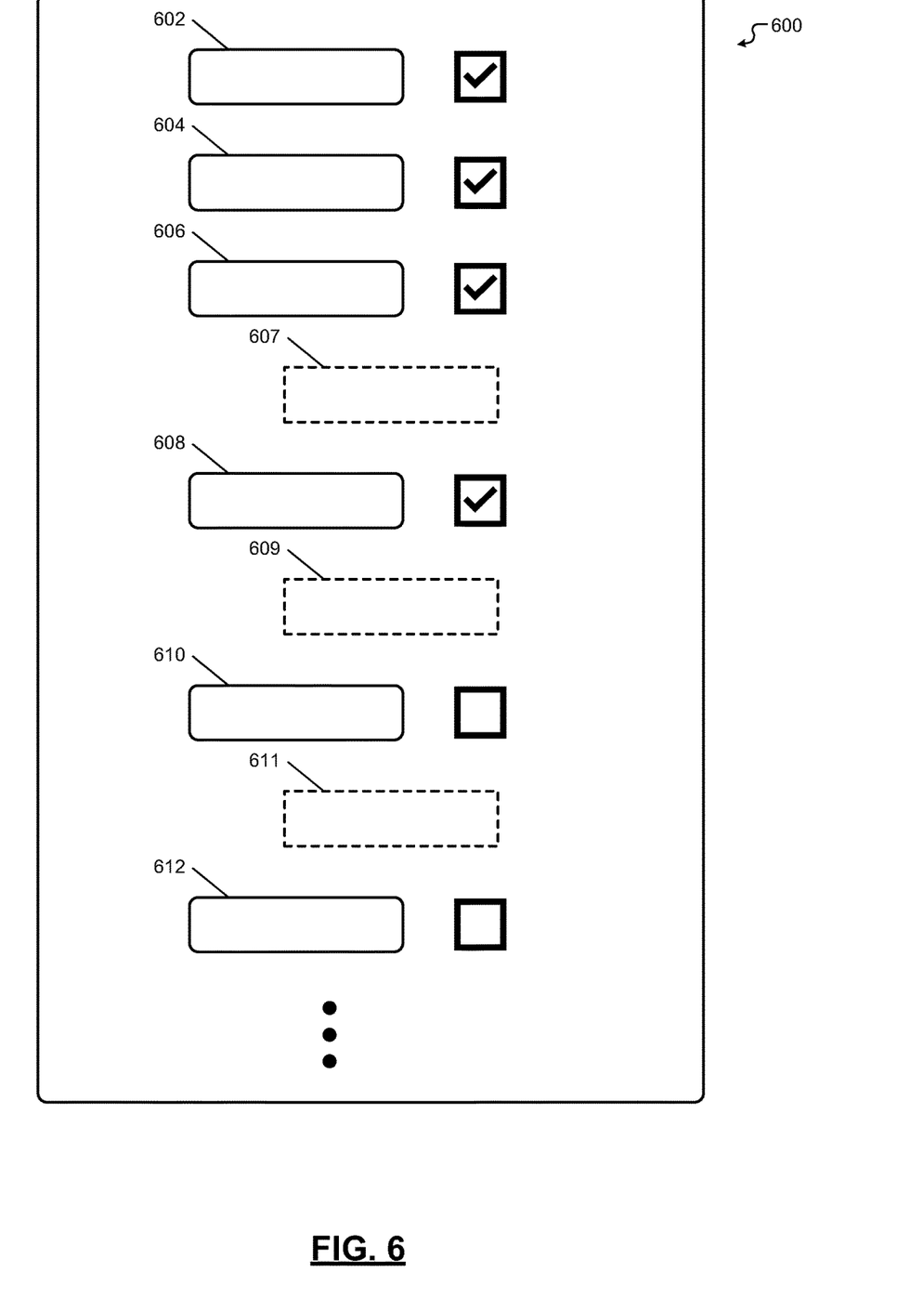
FIG. 6 is a diagram of an example user interface of a mobile device for controlling battery charge management during a parked vehicle time period, according to the present disclosure.

FIG. 6 is a diagram of an example user interface of a mobile device for controlling battery charge management during a parked vehicle time period. In some examples, the mobile device 600 of FIG. 6 may be similar to the mobile device 40 of FIG. 1.

As shown in FIG. 6, the mobile device 600 includes a user interface that provides a variety of buttons to the user to implement vacation mode features for managing remaining mileage based on a state of charge of a battery of the vehicle. For example, the button 602 allows a user to turn the vacation mode feature on and off.

The button 604 allows a user to select whether or not they would like to receive a remaining mileage reminder. In some examples, a user may be able to select how often they would like to be notified of updates to the estimated remaining mileage of the vehicle, such as every day, every week, every six hours, etc.

The button 606 allows a user to specify a time window for activating the vacation mode settings. For example, a time entry field 607 allow a user to enter a start time and end time of the vacation mode (e.g., a period of time for which the vehicle will be in a parked state).

The button 608 allows a user to specify whether they would like to enter a desired mileage reservation value, for how much mileage should be available in the vehicle at the end of the vacation mode time period. A reserved mileage entry field allows the user to input a desired remaining mileage, such as twenty miles, fifty miles, one-hundred miles, etc., that they would like to have available when the vacation time period is over.

As described above, users may indicate which specific features they would like to disable during the vacation mode time period. For example, the button 610 allows the user to enable or disable a first vehicle feature during the vacation mode timer period. Optionally, the user can enter a feature one disable time period in the field 611, if they would only like to disable the feature for a certain portion of each day (e.g., only disabling cabin comfort features at night when the temperatures are cooler, etc.). The button 612 allows the user to selectively enable or disable a second vehicle feature during the vacation mode time period. Although FIG. 6 illustrates only two feature buttons, other examples may include a suitable number of vehicle feature buttons for selectively enabling and disabling vehicle features during the vacation time period.

Although FIG. 6 illustrates entering vacation mode control via a mobile device 600, in other embodiments the example control features described herein may be set up though a control panel or other interface of the vehicle. For example, a driver may access a control panel or interface of the vehicle 10 to enter vacation mode settings when they park the vehicle for the last time at the beginning of the vacation time period. As used herein, a vacation mode settings may refer to feature enable and disable settings to be implemented during any expected vehicle parking time periods specified by the user, which may or may not be vacations of the user.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle battery charge management system comprising:
   a battery system configured to provide power to a drive unit of a vehicle and multiple vehicle components;
   a vehicle wireless communication interface configured to communicate with a mobile device; and
   a vehicle control module configured to
      obtain a state of charge of the battery system,
      receive a time period specified by user input, the time period indicative of a window of time where the vehicle will be in a parked state,
      disable at least one of the multiple vehicle components during the time period,
      determine an estimated remaining mileage value according to the state of charge of the battery system, a remaining time in the time period, and a predicted energy consumption of each of the multiple vehicle components that are not disabled during the time period, the estimated remaining mileage value indicative of a driving mileage capacity of the vehicle at an expiration of the time period,
      in response to determining that a vehicle mileage reminder preference has been selected via user input, obtain a previously displayed estimated remaining mileage value, and receive a current remaining mileage estimate according to at least a current state of charge of the battery system, and
      in response to determining that a difference between the current remaining mileage estimate and the previously displayed estimated remaining mileage value is greater than a specified threshold, display the current remaining mileage estimate as a vehicle mileage reminder,
   wherein the mobile device is configured to display the estimated remaining mileage value on a user interface of the mobile device.

2. The system of claim 1, wherein the multiple vehicle components include at least one of a telematics unit, a wireless communication interface, a battery management unit, a cabin comfort system, a remote video viewing device, a surround video recording device, and an audio recording device.

3. The system of claim 1, wherein:
   the vehicle control module is configured to receive a disable time window from user input; and
   the disabling includes disabling the at least one of the multiple vehicle components during the disable time window for each day of the time period.

4. The system of claim 1, wherein the vehicle control module is configured to reenable the disabled at least one of the multiple vehicle components at the expiration of the time period.

5. The system of claim 1, wherein:
   the vehicle control module is configured to receive a disabled feature list from user input; and
   disabling includes disabling vehicle components that are included in the disabled feature list received from the user input.

6. The system of claim 1, wherein the vehicle control module is configured to:
   determine at least one environmental condition at a location of the vehicle during the parked state; and
   maintain at least one of the multiple vehicle components in an enabled state according to the at least one environmental condition.

7. The system of claim 1, wherein:
   the mobile device is configured to display an indicator to allow user input to selectively activate and deactivate a vacation mode operation;
   the vehicle control module is configured to disable the at least one of the multiple vehicle components during the time period in response to the vacation mode operation being activated; and
   the vehicle control module is configured to enable each of the multiple vehicle components in response to the vacation mode operation being deactivated.

8. The system of claim 1, further comprising:
   a charging port on an exterior of the vehicle, the charging port configured to supply power to the battery system; and
   a charging port door configured to selectively lock and unlock to inhibit and allow access to the charging port,
   wherein the mobile device is configured to send an unlock command to the vehicle control module to remotely unlock the charging port door to allow charging of the battery system, in response to an unlock charging port door input received at the user interface of the mobile device.

9. The system of claim 1, wherein the vehicle control module is configured to:
   receive a periodic time period specified by user input, the periodic time period indicative of a window of time where the vehicle will be in a parked state at periodic time intervals; and
   disable at least one of the multiple vehicle components during the periodic time period, for each of multiple periodic time intervals.

10. The system of claim 9, wherein the vehicle control module is configured to determine an estimated energy savings value according to an amount of time in each periodic time period, and a predicted energy consumption of each of the at least one of the multiple vehicle components that are disabled in an amount of time equal to the periodic time period.

11. The system of claim 1, wherein the vehicle control module is configured to:
   receive a mileage reservation value specified by user input, the mileage reservation value indicative of a desired minimum amount of driving mileage capacity of the vehicle at an expiration of the time period;
   determine whether the estimated remaining mileage value is greater than or equal to the received mileage reservation value; and
   transmit a result of the determination to a mobile device for display on a user interface of the mobile device.

12. The system of claim 1, wherein the vehicle control module is configured to, in response to determining that the vehicle is in a plugged in state during the time period, periodically inhibit charging of the battery system to avoid maintaining the battery system at a 100% state of charge for a duration of the time period.

13. A vehicle battery management system, comprising:
   a battery system configured to provide power to a drive unit of a vehicle and multiple vehicle components; and
   a vehicle control module configured to,
      obtain a state of charge of the battery system,
      receive a time period specified by user input, the time period indicative of a window of time where the vehicle will be in a parked state,
      disable at least one of the multiple vehicle components during the time period, determine an estimated remaining mileage value according to the state of charge of the battery system, a remaining time in the time period, and a predicted energy consumption of each of the multiple vehicle components that are not disabled during the time period, the estimated remaining mileage value indicative of a driving mileage capacity of the vehicle at an expiration of the time period, receive a mileage reservation value specified by user input, the mileage reservation value indicative of a desired minimum amount of driving mileage capacity of the vehicle at an expiration of the time period, determine whether the estimated remaining mileage value is greater than or equal to the received mileage reservation value, transmit a result of the determination to a mobile device for display on a user interface of the mobile device, in response to a determination that the estimated remaining mileage value is less than the received mileage reservation value, automatically disable at least one more of the multiple vehicle components during the time period to increase energy consumption savings during the time period, and in response to a determination that the estimated remaining mileage value is less than the received mileage reservation value, automatically disable at least one more of the multiple vehicle components during the time period to increase energy consumption savings during the time period.

14. A method of managing a charge level of a battery system of a vehicle, the method comprising:

obtaining a state of charge of the battery system, the battery system configured to provide power to a drive unit of the vehicle and multiple vehicle components;

receiving a periodic time period specified by user input, the periodic time period indicative of windows of time where the vehicle will be in a parked state at periodic time intervals, disabling at least one of the multiple vehicle components during the periodic time period, for each of the periodic time intervals;

determining, for each of the periodic time intervals, an estimated remaining mileage value according to the state of charge of the battery system, a remaining time in the periodic time period, and a predicted energy consumption of each of the multiple vehicle components that are not disabled during the periodic time period, the estimated remaining mileage value indicative of a driving mileage capacity of the vehicle at an expiration of the periodic time period;

transmitting the estimated remaining mileage value to a mobile device for display on a user interface of the mobile device; and determining an estimated energy savings value according to an amount of time in each periodic time period, and a predicted energy consumption of each of the at least one of the multiple vehicle components that are disabled in an amount of time equal to the periodic time period.

15. The method of claim 14, wherein the multiple vehicle components include at least one of a telematics unit, a wireless communication interface, a battery management unit, a cabin comfort system, a remote video viewing device, a surround video recording device, and an audio recording device.

16. The method of claim 14, further comprising receiving a disabled feature list from user input, wherein disabling includes disabling vehicle components that are included in the disabled feature list received from the user input.

17. The method of claim 14, further comprising:

receiving a mileage reservation value specified by user input, the mileage reservation value indicative of a desired minimum amount of driving mileage capacity of the vehicle at an expiration of the periodic time period;

determining whether the estimated remaining mileage value is greater than or equal to the received mileage reservation value; and transmitting a result of the determination to the mobile device for display on the user interface of the mobile device.

* * * * *